A. MALMROS.

CENTRIFUGAL CREAM SEPARATOR.

No. 11,440. Reissued Sept. 4, 1894

August Malmros

INVENTOR

By his Attorneys,
M. C. Marble & J. Bonsall Taylor

WITNESSES:

F. Norman Dixon.

Thomas K. Lancaster.

UNITED STATES PATENT OFFICE.

AUGUST MALMROS, OF STOCKHOLM, SWEDEN.

CENTRIFUGAL CREAM-SEPARATOR.

SPECIFICATION forming part of Reissued Letters Patent No. 11,440, dated September 4, 1894.

Original No. 495,352, dated April 11, 1893. Application for reissue filed February 3, 1894. Serial No. 499,032. Patented in Sweden, July 11, 1891, No. 3,335; in Norway, July 11, 1891, No. 2,625; in England, February 29, 1892, No. 3,925; in France, February 29, 1892, No. 219,765; in Austria-Hungary, February 29, 1892, No. 27,815 and No. 52,791, and in Belgium, March 1, 1892, No. 98,594.

*To all whom it may concern:*

Be it known that I, AUGUST MALMROS, late farmer, a subject of the King of Sweden and Norway, residing at Uplandsgatan, 39, in the city of Stockholm, Sweden, have invented certain new and useful Improvements in Centrifugal Cream-Separators, (for which I have obtained Letters Patent in Sweden, No. 3,335, dated July 11, 1891; in Great Britain, No. 3,925, dated February 29, 1892; in France, No. 219,765, dated February 29, 1892; in Belgium, No. 98,594, dated March 1, 1892; in Austria-Hungary, No. 27,815 and No. 52,791, dated February 29, 1892, and in Norway, No. 2,625, dated July 11, 1891,) of which I declare the following to be a full, clear, and exact description.

My invention has relation to centrifugal separators, and among the objects sought to be attained, are to provide a device of this class by which the separation of the cream is readily effected, and said separated cream forced toward the outlet opening in a continuous stream and a regular and even discharge effected; also, to provide such a separator which is of extremely simple construction and adapted for ready cleaning, and with the above and minor objects in view the invention consists in the construction, arrangement and combination of parts, as hereinafter fully described, illustrated in the accompanying drawings and pointed out in the appended claims.

Figure 1:
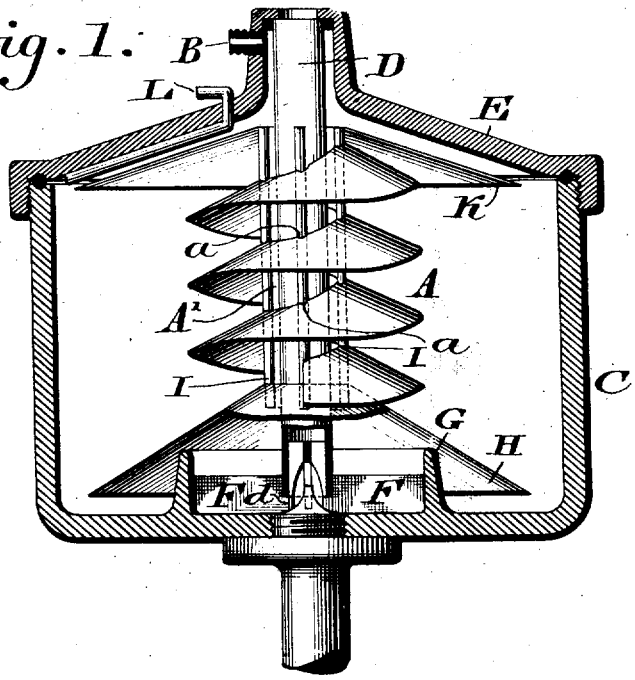
Figure 2:
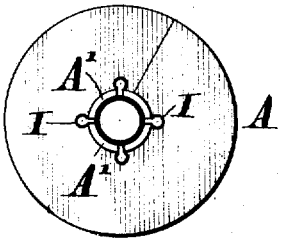

The drawings represent in Figure 1 a vertical sectional elevation of my separator, and in Fig. 2 a plan of the feed-tube and screw-worm, detached.

This improvement consists in a screw-worm A, placed in the revolving vessel C (see annexed drawings), the axis of which worm coincides with the axis of the separator shaft. The screw-worm itself is attached to a tube, between which and the worm there are openings A′ left, through which the cream can rise to the outlet B. This outlet is formed of a pierced screw, and approaches a little nearer the center of the vessel than the inner edge of the screw-worm; consequently the cream confines itself in a column whose perpendicular surface stands at a distance from the inner edge of the worm equal to the distance that the outlet projects beyond the inner edge of said worm. Viewing the worm in cross section it will be seen that it can project from the shaft either at right angle or at an angle inclining upward or downward toward the radius of the drum. The object of the screw-worm is to move the cream upward or downward according to the situation of the outlet for the cream. The screw-worm rotates, as will be understood, with the drum, but as the liquid mass rotates always somewhat more slowly than the drum, it is effected by the screw.

In the separators hitherto used it is generally the case that the cream, owing to its being highly compressed, is discharged principally from the space nearest the outlet, and in this way there will, of course, be an afflux of the cream farthest from the outlet, but at the same time, also, there will be an afflux of the milk nearest the outlet, which is evidently disadvantageous. If on the other hand, the screw-worm is employed, the cream is forced to move toward the outlet. By trials it has been ascertained that, even though the area of the milk and cream outlets to an ordinary milk separator without this screw-worm are regulated so as to give a continuous and even discharge, it will soon be seen by inserting the screw-worm that without altering the outlets, the discharge of cream will be increased in a manifold degree, which proves what a good effect the screw-worm has. By the use of the screw-worm I obtain the result that the mass of cream is sucked or drawn toward the outlet, which in its order has the result that only the purest cream is discharged, and that the working capacity of the separator is very much increased. It should be observed that in the drum there is no radial wing forcing the liquid mass to partake of the motion of the centrifugal drum. The pitch of the worm, its inner and outer diameter and its inclination toward the radius of the drum may of course vary according to different circumstances. The screw-worm will, as is quite evident, continue to have the desired effect even though the perpendicular surface of the liquid should recede from the interior edge of the worm.

In order to hold the screw-worm A in place in the rotating vessel C the following means are used:—D is a tube descending from the lid E, of the vessel to its bottom. The principal purpose of this tube is to conduct the milk into the separator being therefore provided at the bottom with openings, *d*, through which the milk streams out and is caught by the wings F. The milk then passes over the edge G going under the conical hood H out toward the periphery of the rotating vessel. The tube D is provided with a greater or less number of ribs I which should be made wider toward the periphery of the vessel as shown in detail in Fig. 2. In the screw-worm A there are corresponding slots *a*, so that when the screw-worm with these slots is pressed into its place on the ribs it will be solidly secured. The same means is taken for holding in place the hood H, and the upper hood K, immediately under the lid of the apparatus. The skim-milk is discharged through the pipe L.

It is obvious that the screw-worm does not need to be made in a single piece but can be made in sections, secured and put together in any suitable manner, thus rendering it easy to clean. It is also evident that the screw-worm may be plain or corrugated.

What I claim is—

1. In a centrifugal separator, in combination with a revoluble drum provided with discharge openings for the milk and cream,—a feed tube arranged within the drum, and a screw-worm supported within the drum and of diameter less than that of the interior space of the drum,—substantially as set forth.

2. In a centrifugal separator, the combination with a revoluble drum, of a feed tube arranged within and revolving with the drum, a screw-worm having a diameter less than that of the drum, the inner edge of the worm being somewhat removed from the tube, and the drum being provided with discharge openings for the milk and cream, substantially as set forth.

3. In a centrifugal separator, the combination with a revoluble drum, of a feed tube arranged within and revolving with the drum, a screw-worm supported by said tube and having a diameter less than that of the drum, the inner edge of the worm being somewhat removed from the tube whereby vertical passages are formed, the drum being provided with discharge openings for the skim-milk and cream, that for the former communicating with the interior of the drum and that for the latter with the vertical passages, as described.

4. In a centrifugal separator, the combination with a revoluble drum having discharge openings for the separated fluids, of a screw-worm arranged within the drum, a feed tube also arranged within the drum and having ribs, to which is connected the screw-worm, the inner edge of the worm being somewhat removed from the tube whereby vertical passages are formed, as and for the purpose specified.

5. In a centrifugal separator, the combination with a revoluble drum, of a feed tube having a discharge opening at its lower end, a screw-worm supported by said tube, the inner edge of the worm being somewhat removed from the tube whereby vertical passages are formed, the drum being provided with outlets for the skim-milk and cream, the former communicating with the interior of the drum beyond the outer edge of the worm and the opening for the cream being located above the worm and communicating with the vertical passages, as described.

6. In a centrifugal separator, the combination with a revoluble drum, of a feed tube arranged therein and revolving therewith, and provided with a discharge opening at its lower end, a screw-worm connected to and rotating with the tube, a hood located between the lower end of the worm and the discharge opening, the inner edge of the worm being somewhat removed from the tube whereby vertical passages are formed, a second hood located between the upper end of the worm and the top of the drum, the drum being provided with outlets for the skim-milk and the cream, that for the skim-milk communicating with the interior of the drum beyond the outer edge of the latter hood, and that for the cream being located above the said hood and communicating with the vertical passages, as described.

7. In a centrifugal separator, the combination with a revoluble drum, of a feed tube provided at its lower end with a discharge opening, a series of ribs on said tube, a screw-worm supported by said ribs and having a diameter less than that of the interior of the drum, the inner edge of the worm being somewhat removed from the tube whereby vertical passages are formed, a vertical extension of the drum formed upon the bottom of the same, a hood carried by the ribs and arranged above the upper edge of said extension, and a second hood also carried by the ribs and arranged above the upper end of the worm, the drum being provided with discharge openings for the skim-milk and the cream, arranged as described.

In testimony that I claim the foregoing as my invention I have hereunto signed my name this 22d day of December, 1893.

AUGUST MALMROS.

In presence of—

CARL TH. SUNDHOLM,
ERNST HJALMAR BRUHN.